United States Patent [19]

Shibayama et al.

[11] Patent Number: 5,247,273
[45] Date of Patent: Sep. 21, 1993

[54] SURGE ABSORBER FOR PROTECTION OF COMMUNICATION EQUIPMENT CONNECTED TO COMMUNICATION LINES

[75] Inventors: Takashi Shibayama; Takaaki Itoh; Fujio Ikeda; Masatoshi Abe, all of Saitama, Japan

[73] Assignee: Mitsubishi Materials Corporation, Tokyo, Japan

[21] Appl. No.: 853,912

[22] Filed: Mar. 19, 1992

[30] Foreign Application Priority Data

Mar. 22, 1991 [JP] Japan ................................. 3-83147
Mar. 22, 1991 [JP] Japan ................................. 3-83148

[51] Int. Cl.$^5$ ..................... H01H 61/00; H01H 71/14
[52] U.S. Cl. ........................................ 337/16; 337/32; 361/119
[58] Field of Search .................... 361/119, 124, 55, 56; 337/28, 32, 27, 15, 16, 14

[56] References Cited

U.S. PATENT DOCUMENTS

| | | | |
|---|---|---|---|
| 4,720,759 | 1/1988 | Tabei | 361/105 |
| 4,723,190 | 2/1988 | Chung | 361/91 |
| 5,157,580 | 10/1992 | Hegner et al. | 337/32 |

*Primary Examiner*—Harold Broome
*Attorney, Agent, or Firm*—McAulay Fisher Nissen Goldberg & Kiel

[57] ABSTRACT

A surge absorber including a surge absorbing element for protecting communication equipment from transient surges and a thermal response switch with an automatic restoration function connected in parallel with the surge absorbing element. The inventive surge absorber prevents abnormal and deleterious heating of the surge absorbing element when continuous overvoltages or overcurrents are applied to the surge absorber.

5 Claims, 3 Drawing Sheets

SURGE ABSORBER FOR PROTECTION OF COMMUNICATION EQUIPMENT CONNECTED TO COMMUNICATION LINES

BACKGROUND OF THE INVENTION

This invention relates to a surge absorber used for protecting communication equipment, such as, facsimiles, telephone switchboards, modems, and the like, from transient surges generated into the communication lines by lightning, and the like. More particularly, it relates to a surge absorber which includes a surge absorbing element for protecting communication equipment from transient surges and a thermal response switch which is connected in parallel to the surge absorbing element and which prevents abnormal and deleterious heating of the surge absorbing element when continuous overvoltages or overcurrents flow into the surge absorber.

Surge absorbing elements are conventionally classified into two types, i.e., 1) semiconductors, such as, ZnO varistors, SiC varistors, zener diodes, etc.; and 2) gas discharge tubes, such as, air gap discharge tubes, micro gap discharge tubes, etc.. As compared to type 2), type 1) can easily respond to transient surges. However, type 1) cannot accommodate a larger surge current because it has a higher resistance than type 2).

Such a surge absorbing element is connected in parallel with a pair of input lines to the electronic device to be protected and is designed to operate at a higher voltage than the operating voltages of the electronic device. The surge absorbing element is a resistor having a high resistance when the voltage applied thereto is lower than the discharge starting voltage or striking voltage thereof, and is a resistor having a low resistance of tens of ohms when the voltage applied thereto is higher than the discharge starting voltage or striking voltage thereof.

Accordingly, when surge voltages, such as, lighting surges, etc., are instantaneously applied to an electronic circuit including the surge absorbing element and the electronic device, the surge absorbing element conducts the surge voltages and serves to protect the electronic device from the surge voltages. However, when an overvoltage or overcurrent, e.g., due to an accident, is continuously applied to the electronic circuit, a certain amount of current continuously flows through the surge absorbing element. This results in the surge absorbing element being heated to high temperatures. The heat radiating from the surge absorbing element can cause the protected electronic device as well as electronic devices surrounding the surge absorbing element to be damaged and/or catch fire.

The semiconductor type of surge protecting element is particularly prone to severe overheating upon the application of a continuous overvoltage or overcurrents due to its higher resistance. This can result in deterioration of the performances, destruction of the element, and/or, catching fire of the protected electronic device, as well as electronic devices surrounding the semiconductor type element. Also, ZnO varistors in semiconductors generate high remaining voltages which can lead to thermal damage to the varistors and electronic circuits connected to the varistors.

A typical example would be an accident wherein the communication lines of the communication equipment contact the AC power lines. While it does not usually happen that such accidental overvoltages or overcurrents are continuously applied to the surge absorbing element, to achieve maximum safety, it is now recognized that additional safety measures should be taken to avoid such accidental problems and the potential fires caused thereby. As an example, the UL (Underwriter's Laboratories Inc.) of the U.S.A. prescribes a safety standard for surge absorbing elements so that they do not cause fire or electrical shock in electronic devices surrounding the surge absorbing element when continuous overvoltages or overcurrent are applied.

A surge absorber capable of passing the above safety standard is disclosed in Japanese laid-open patent application No. S63-18923. Shown therein is a surge absorber comprising a gas discharge tube and a low melting point metal wire which is connected in series to the gas discharge tube and is adhered to the surface of the gas discharge tube. When an overvoltage or overcurrent, caused by the accidental contact of the communication lines with the AC power lines, is continuously applied to this surge absorber, the series connected low melting point metal wire is blown by the heat radiating from the surface of the gas discharge tube. This disconnects the current flowing to the gas discharge tube and prevents the abnormal heating of the gas discharge tube. However, this surge absorber has the disadvantage that it must be replaced whenever the low melting point metal wire is blown in order to immediately restore the electronic circuit connecting the surge absorber. This replacement procedure is time-consuming and troublesome. If a low melting point metal wire having a larger thermal capacity is used to avoid the problem, the low melting point wire can not be blown and the gas discharge tube is then heated to abnormally high temperatures, results in the electronic device catching fire.

SUMMARY OF THE INVENTION

It is an object of this invention to provide a surge absorber which includes a surge absorbing element for protecting communication equipment from transient surges and a thermal response switch which is connected in parallel with the surge absorbing element and which prevents abnormal and deleterious heating of the surge absorbing element when continuous overvoltages or overcurrents are applied to the surge absorber.

It is another object of this invention to provide a surge absorber which includes a surge absorbing element for protecting communication equipment from transient surges and a thermal response switch which is automatically restored to its original position after the continuous overvoltages or overcurrents stop.

It is still another object of this invention to provide a surge absorber which includes a semiconductor surge absorbing element for protecting communication equipment from transient surges and a thermal response switch which is connected in parallel with the semiconductor surge absorbing element to prevent thermal damage to the semiconductor and lowering of the remaining voltage of the semiconductor when continuous overvoltages or overcurrents flow to the surge absorber.

These objects are achieved by the inventive surge absorber which comprises a surge absorbing element, means for connecting the surge absorbing element between a pair of input lines of communication devices to be protected, and a thermally activated means connected parallel to the surge absorbing element and which shunts a current through the surge absorber to bypass the surge absorbing element when the temperature increases above a predetermined value, but does not shunt the current when the temperature is at a lower, safe value.

DETAILED DESCRIPTION OF THE INVENTION

Figure 1:
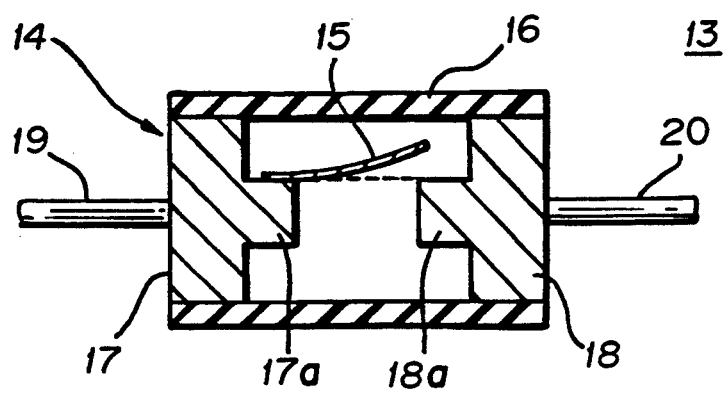
FIG. 1 is a sectional view of an embodiment of the inventive surge absorber having a gas discharge tube as the surge absorbing element.

The surge absorber according to this invention comprises a surge absorbing element parallel connected to a thermal response switch having an automatic restoration function, i.e., an on-off switch which responds to change in temperature.

Surge absorbing elements which can be used in this invention include semiconductors, such as, ZnO varistors, SiC varistors and zener diodes, and gas discharge tubes having opposing electrodes, such as, air gap discharge tubes, micro gap discharge tubes and the like.

When a gas discharge tube having two opposite electrodes is used as the surge absorbing element, the thermal response switch may be a bimetallic or memorizing alloy element having one end connected to one electrode of the gas discharge tube. The other end is free and movable between two positions, namely, a contact position and a non-contact position. In the contact position, the free end of the alloy piece contacts the other electrode whereas in the non-contact position, the free end is spaced apart from the electrode.

When a semiconductor is used as the surge absorbing element, the thermal response switch may comprise two opposing bimetallic or memorizing alloy pieces having end portions which are movable into and out of contact with each other. The other end portions of the pieces are adhered or bound to an insulative element which is sandwiched between them.

When a surge voltage is instantaneously applied to this surge absorber using either a gas discharge tube or a semiconductor surge absorbing element, the thermal response switch remains in the opened or off position, and the surge absorbing element operates to suppress the surge voltages. However, when overvoltages or overcurrents are continuously applied to the inventive surge absorber wherein the surge absorbing element is a gas discharge tube, the gas discharge tube is heated to high temperatures by the resulting continuous arc discharge which, in turn, raises the temperature of the alloy element. The thermal response switch moves to the on position, i.e., the movable free end contacts with the other electrode of the gas discharge tube. As a result, the two opposing electrodes of the gas discharge tubes are shorted, and the continuous arc discharge of the gas discharge tube stops, thus protecting the gas discharge tube from the abnormal heating.

When an overvoltage or overcurrent is continuously applied to the surge absorber using a semiconductor as the surge absorbing element, the thermal response switch heats-up due to its high resistance. The two movable free end portions then move into the on position, i.e., they move into contact with each other. As a result, a by-pass circuit is formed in the absorber through the thermal response switch and the semiconductor is then protected from the abnormal self-heating.

After the continuous overvoltage or overcurrent applied to the surge absorber stops (with either the gas discharge tube or the semiconductor), the temperature decreases and the thermal response switch automatically resumes its original position, i.e., the off or out-of-contact position. As used herein, the term "an overvoltage or overcurrent" means an abnormal voltage above the discharge starting voltage of a surge absorbing element and an abnormal current accompanied by the abnormal overvoltage.

EMBODIMENT 1

Referring to FIG. 1, an embodiment of the inventive surge absorber 13 is shown comprising an air gap discharge tube having two opposing metal electrodes 17, 18 with a discharge starting voltage of 300 volts as the surge absorbing element 14. A two-layer bimetallic piece 15 comprising a Fe-Ni alloy layer having a higher thermal conductive coefficient and an Invar alloy layer of a lower thermal expansion coefficient is used as the thermal response element. This surge absorber 13 is manufactured by spot welding the Invar alloy layer of one end of the bimetallic piece 15 to the inner part 17a of metal electrode 17, and inserting the metal electrodes 17 and 18 into the respective ends of the inorganic glass tube 16 so that the other end of the bimetallic piece 15 is spaced apart from the upper surface of the inner part 18a of metal electrode 18. Inorganic glass tube 16 is filled with argon gas and sealed. Lead wires 19 and 20 are then attached to metal electrodes 17 and 18, respectively.

Figure 2:
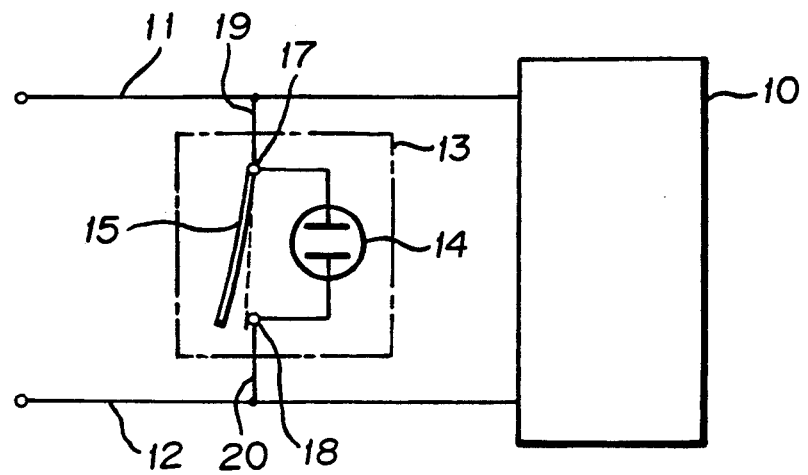
FIG. 2 is a circuit diagram of an electric circuit including the surge absorber shown in FIG. 1.

As shown in FIG. 2, surge absorber 13 is connected between a pair of input lines 11 and 12 of the communication equipment or device 10 to be protected. When surge voltages are instantaneously applied to this surge absorber 13 through the input lines 11 and 12, the air gap discharge tube 14 discharges and serves to protect the communication equipment 10 from the surge voltages. When an overvoltage or overcurrent is continuously applied to surge absorber 13 through the input lines 11 and 12, the air gap discharge tube 14 is heated to high temperatures by its own continuous arc discharge. This increases the temperature of the free end of bimetallic piece 15, which causes it to straighten and move to the position illustrated by the dotted line of FIG. 1, thus contacting the inner part 18a of metal electrode 18. As a result, the two opposing electrodes 17 and 18 are shorted through piece 15, and the continuous arc discharge which causes the abnormal heating of the air gap discharge tube 14 stops. When the overvoltages or overcurrent stop, bimetallic piece 15 cools and moves back to the first position, out of contact with inner part 18.

EMBODIMENT 2

Figure 3:
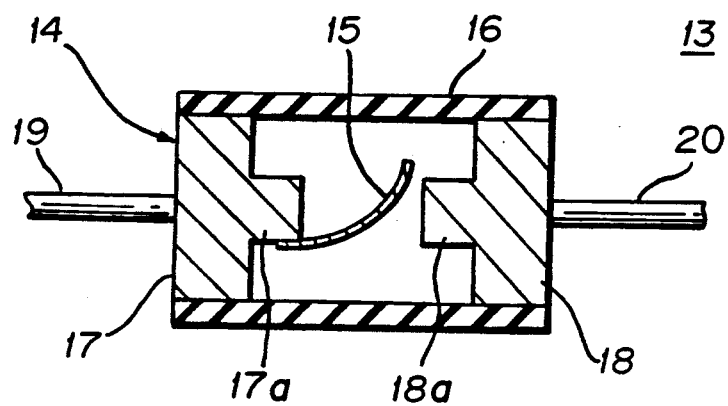
FIG. 3 is a sectional view of another embodiment of the inventive surge absorber having a gas discharge tube as the surge absorbing element.

Referring to FIG. 3, another embodiment of the inventive surge absorber 13 is shown. In FIG. 3, the corresponding elements are referred to with the same reference numerals as in FIG. 1.

This surge absorber 13 is manufactured in the same manner as that of Embodiment 1 except that one end of the Fe-Ni alloy layer of bimetallic piece 15 is spot-welded to the lower surface of the inner part 17a of metal electrode 17, and the other end thereof is spaced apart from the upper surface of the inner part 18a of metal electrode 18. Bimetal piece 15 can easily result in shorting between metal electrodes 17 and 18, it is in the path of the arc discharge, and is thus more quickly heated by the discharge, as compared with the inventive absorber of Embodiment 1.

In the same manner as in Embodiment 1, this surge absorber is connected across a pair of input lines and operates to suppress the continuous overvoltage or over-current.

EMBODIMENT 3

Figure 4:
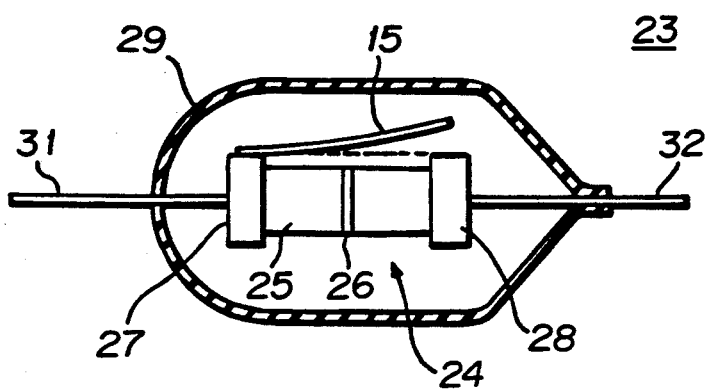
FIG. 4 is a sectional view of other embodiment of the inventive surge absorber having a gas discharge tube.

FIG. 4 depicts yet another embodiment of the inventive surge absorber. The surge absorbing element is a micro gap discharge tube 24 having a discharge starting voltage of 300 volts and the same bimetallic element 15 as used in Embodiment 1.

Surge absorber 23 is manufactured by coating a columnar ceramic element 25 with a conductive thin film and forming a micro gap 26 having a width about several tens of microns perpendicular to the longitudinal axis of the columnar ceramic element at the center of the surface of the coating. Cap electrodes 27 and 28 are attached to the respective ends of the columnar element 25. One end of bimetallic piece 15 is spot welded to the surface of cap electrode 27 such that the other free end of the bimetallic piece 15 is spaced apart from the surface of cap electrode 28. Lead wires 31 and 32 are attached to cap electrodes 27 and 28. The resulting element is sealed in glass tube 29 which is filled with argon gas. In the same manner as that of Embodiment 1, this surge absorber is connected to a pair of input lines and operates to suppress the continuous overvoltage and overcurrent.

EMBODIMENT 4

Figure 5:
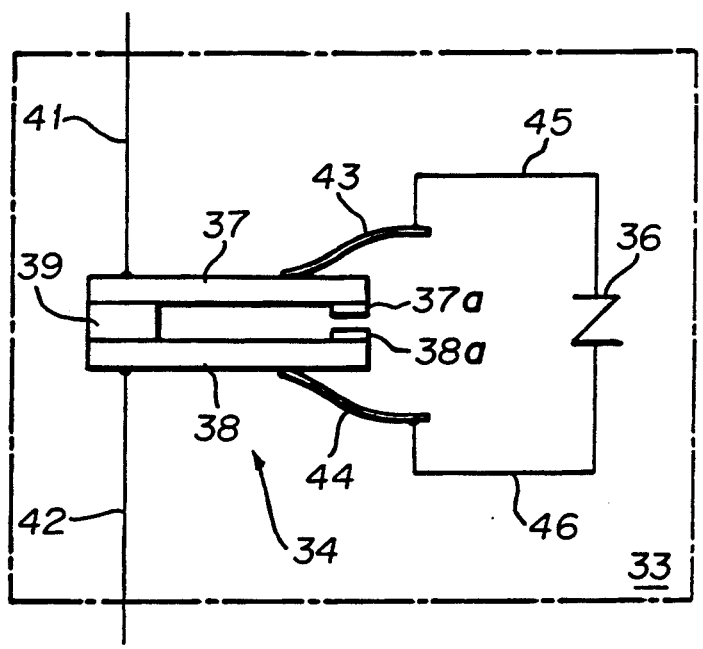
FIG. 5 is a sectional view of one embodiment of the inventive surge absorber having a semiconductor as the surge absorbing element.

Referring to FIG. 5, an embodiment of the inventive surge absorber 33 wherein a semiconductor is used as the surge absorbing element is shown.

In surge absorber 33, a ZnO varistor 36 having a discharge starting voltage of 300 volts is used as the semiconductor, and a thermal response switch 34 comprising two opposing ends of pieces 37 and 38 are adhered to an insulative element 39 of alumina such that the other ends are held in a spaced-apart position. These free ends have contact points 37a and 38a which are in opposing relationship. The same metals or alloys as that of Embodiment 1 are used as pieces 37 and 38. Surge absorber 33 is manufactured by pressing the respective ends of two phosphorus bronze flat springs 43 and 44 to the respective upper surfaces of the bimetallic pieces 37 and 38 and connecting the respective other ends of two phosphorus bronze pieces 37 and 38 to the ZnO varistor 36 through lead wires 45 and 46. Lead wires 41 and 42 are then attached to the respective upper surfaces of bimetallic pieces 37 and 38. In this case, the respective ends of the phosphorus bronze flat springs 43 and 44 should not be soldered or spot-welded to the upper surfaces of the bimetallic pieces 37 and 38, in order to promote the rapid operations of bimetallic pieces 37 and 38.

This surge absorber is connected between a pair of input lines 11 and 12 of the communication equipment 10 to be protected through lead wires in a manner similar to that of embodiment 1. When surge voltages are instantaneously applied to surge absorber 33 through the input lines 11 and 12, the ZnO varistor 36 conducts the surges voltages and serves to protect the communication equipment 10 from the surge voltages. However, when an overvoltage or overcurrent is continuously applied to this surge absorber 33 through input lines 11 and 12, the respective bimetallic pieces 37 and 38 heat up due to their higher resistance and contacting points 37a and 38a move toward and contact each other. This produces a by-pass circuit in absorber 33 through the thermal response switch 34 through which the continuous overcurrent flows. The ZnO varistor is thus protected from the abnormal heating and the remaining voltage of the varistor is lowered. After the overvoltage or overcurrent stops, elements 37 and 38 cool and contact points 37a and 38a move out of contact with one another and are restored to their original position.

The following examples illustrate the invention:

TEST 1

Three overvoltage-overcurrent tests and a surge application test are carried out with the absorbers of embodiments 2 and 3 under the following conditions.

Overvoltage-overcurrent test A:

A current of 40 A having a AC voltage of 600 V is respectively applied to the respective electronic circuits of embodiment 2 and embodiment 3 for 1.5 seconds.

Overvoltage-overcurrent test B:

A current of 2.2 A having an AC voltage of 600 V is respectively applied to the respective electronic circuits of embodiment 2 and embodiment 3 for 30 minutes.

Overvoltage-overcurrent test C:

A current of 0.5 A having an AC voltage of 600 V is respectively applied to the respective electronic circuits of embodiment 2 and embodiment 3 for 30 minutes.

Surge application test:

A quasi-surge current of $(8 \times 20)$ $\mu$sec $-500$ A is respectively applied to the respective electronic circuits of Embodiment 2 and Embodiment 3.

Also, as comparative examples, the above tests are carried out with the surge absorbers which are equivalent to that of Embodiment 2 and Embodiment 3 except that a fuse of 0.5 A is substituted for the bimetallic element and is connected between one input line to protect the surge absorber. Also, the applied quasi-surge current in the surge application test is $(8 \times 20)$ $\mu$sec $-200$ A.

In the above overvoltage-overcurrent tests, the inventive surge absorbers of Embodiments 2 and 3 can suppress the larger continuous overvoltage or overcurrent without abnormal heating, while the comparative surge absorbers are heated to abnormally high temperatures. Also, the performance of the surge absorbers of Embodiments 2 and 3 are not adversely affected, even by the larger quasi-surge current. However, the fuses which were series connected to the comparative surge absorbers are blown and the comparative surge absorbers are damaged by the quasi-surge current.

TEST 2

The following two surge application tests are carried out with the inventive surge absorber of embodiment 4 and a comparative ZnO varistor equivalent to that of embodiment 4 except that it has no thermal response switch.

Surge application test A:

A quasi-surge voltage of $(1.2 \times 50)$ μsec−10 KV is applied to the respective electronic circuits using the respective absorbers, the electronic circuits of which are equivalent to that of Embodiment 1.

Surge application test B:

A quasi-surge current of $(8 \times 20)$ μsec−3 KA is applied to the respective electronic circuits using the respective surge absorbers.

Figure 6:
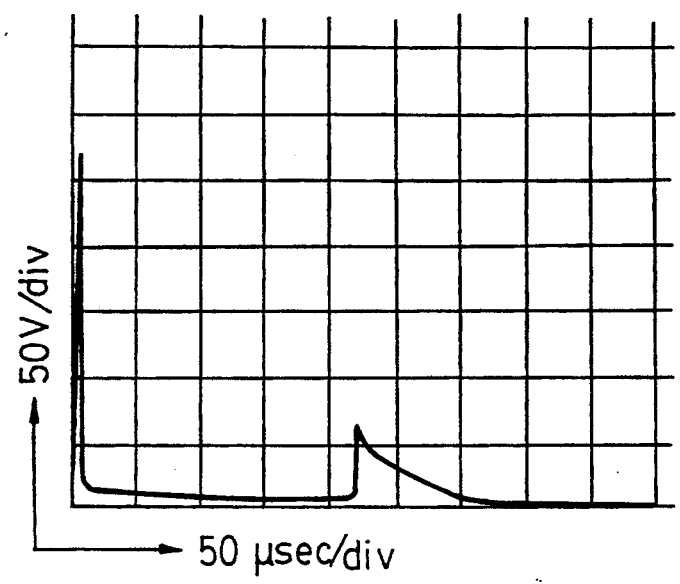
FIG. 6 is a plot depicting the remaining voltage vs. time for the surge absorber of FIG. 5.
Figure 7:
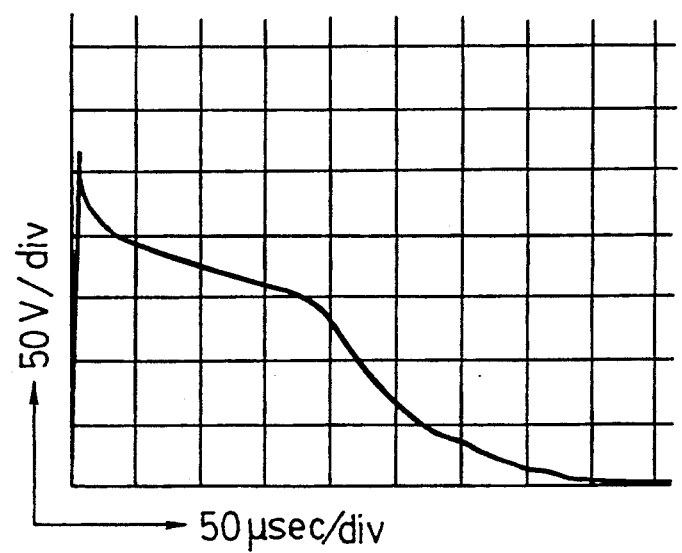
FIG. 7 is a plot similar to FIG. 6 for a conventional ZnO varistor.

FIGS. 6 and 7 show the surge absorption wave forms of the inventive surge absorber and the ZnO varistor, respectively for test A.

As can be seen from FIGS. 6 and 7, the comparative ZnO varistor generates a higher remaining voltage for a period of about 400 μsec. Particularly, the maximum value is about 200 to 150 volts for a period of about 200 μsec after a quasi-surge voltage is applied to the ZnO varistor. In comparison, the inventive surge absorber can suppress the remaining voltage at a period of about 2 μsec while it generates a remaining voltage of about 250 volts immediately after the quasi-surge voltage is applied thereto. Also, while the inventive surge absorber generates a remaining voltage of about 50 volts at a time of about 200 μsec, this results from the restoration of the thermal response switch and does not influence its surge absorbing performance.

When the quasi-surge voltage of test B is respectively applied while the discharge starting voltage of the comparative ZnO varistor is lowered from the rating value of 30 volts to 250 volts due to thermal damage. In contrast, the discharge starting the inventive surge absorber does not change.

What is claimed is:

1. A surge absorber used for protecting communication equipment which comprises:

a) a surge absorbing element having first and second opposing electrodes;
   b) means for connecting the surge absorbing element across a pair of input lines of a communication device to be protected;
   c) thermally activated means parallel connected to the surge absorbing element which, in response to a first temperature at or higher than a predetermined value, shunts a current through the surge absorber so as to bypass the surge absorbing element, and which, in response to a second temperature lower than the predetermined value, does not shunt the current to bypass the surge absorbing element, the thermally activated means comprising a bimetallic or memorizing alloy element having first and second ends, the first end being connected to the first electrode and the second end being free and movable between first and second positions depending on the temperature of the alloy element, wherein when the temperature is at the first temperature, the second end is in contact with the second electrode, and when the temperature is at the second temperature, the second end is spaced apart from the second electrode.

2. The surge absorber of claim 5 wherein said thermally activated means is a thermal response switch comprising two opposing bimetallic or memorizing alloy elements held in a spaced apart position by an insulator sandwiched therebetween, portions of each of the alloy elements being movable between two positions depending on the temperature of the alloy elements, wherein at the first temperature, the portions of the alloy elements are in contact with one another, and at the second temperature, the portions are out of contact with one another.

3. The surge absorber of claim 2 wherein each movable portion is connected to lead wires of the surge absorbing element by a phosphorous bronze spring member.

4. The surge absorber of claim 1 wherein the surge absorbing element is a gas discharge tube.

5. The surge absorber of claim 1 wherein said surge absorbing element is a semiconductor.

* * * * *